United States Patent
Yoo

[15] 3,669,949
[45] June 13, 1972

[54] PROCESS FOR PRODUCING A CIS-1,4 DIOLEFIN

[72] Inventor: Jin Sun Yoo, South Holland, Ill.

[73] Assignee: Atlantic Richfield Company, New York, N.Y.

[22] Filed: July 28, 1969

[21] Appl. No.: 845,496

[30] Foreign Application Priority Data

[52] U.S. Cl ...... 260/680B, 252/429B, 252/430, 260/666B, 260/683.15D
[51] Int. Cl. .......................... C07c 3/10, C07c 11/12
[58] Field of Search ........................ 260/680B

[56] References Cited

UNITED STATES PATENTS

| | | | |
|---|---|---|---|
| 3,096,385 | 7/1963 | McConnell et al | 260/683.15 |
| 3,405,194 | 10/1968 | Iwamoto et al | 260/680 |
| 3,407,245 | 10/1968 | Sarafidis | 260/680 |
| 3,408,418 | 10/1968 | Iwamoto et al (II) | 260/680B |
| 3,409,681 | 11/1968 | Kroll | 260/666 |
| 3,457,319 | 7/1969 | Olechlowski et al | 260/677 |
| 3,496,247 | 2/1970 | Yuguchi et al | 260/680 |
| 3,535,303 | 10/1970 | Ichikawa et al | 260/680B |
| 3,558,517 | 1/1971 | Hughes et al | 260/683D |
| 3,592,869 | 7/1971 | Cannell | 260/683.15 |

*Primary Examiner*—Paul M. Coughlan, Jr.
*Attorneys*—Thomas J. Clough, Blutcher S. Thorp, Frank J. Uxa

[57] ABSTRACT

A solid phase catalyst composition comprising a complex of iron or cobalt, a Group V-A electron donor ligand, and a non-protonic Lewis acid and reducing agent on a solid acidic silica-based support. Exemplary is a complex comprising ferric acetylacetonate, bis(diphenylphosphino)ethane, and triethylaluminum on a solid, acidic silica-based support. Use of such catalysts in the copolymerization of monoolefin hydrocarbons with diolefin hydrocarbons is disclosed.

21 Claims, No Drawings

PROCESS FOR PRODUCING A CIS-1,4 DIOLEFIN

BACKGROUND OF THE INVENTION

1. Field of the Invention

This invention relates to novel catalyst compositions. The invention also relates to processes utlizing such compositions for codimerization, oligomerization or polymerization of monoolefins with conjugated diolefins. In particular this invention relates to a solid phase catalyst composition having a solid, acidic silica-based support which catalyst exhibits unusual activity for preparation of 1,4-dienes from monoolefins and conjugated dienes.

2. Description of the Prior Art

Numerous catalysts have been disclosed in the prior art as suitable for the preparation of addition products of olefins. Certain of these are useful for the preparation of low molecular weight dimers, trimers, tetramers, and the like. Others are used for the preparation of high molecular weight addition products, such as polymers and copolymers. The polymeric and oligomeric products derived from the catalytic addition reactions are often valuable materials in the petrochemical, fuel, and plastics industries, and the like.

Commonly used catalyst systems having catalytic activity for the preparation of oligomers and low molecular weight polymers are the homogeneous liquid phase organophosphine complexes of transition metals such as iron, cobalt, and nickel. Often included in such catalyst systems is a reducing agent, such as an alkyl aluminum, for example, triethylaluminum, to create a more active species of the catalyst. Such complex catalysts are often prepared by contacting the transition metal, ordinarily as a salt, with an organophosphine at ambient or elevated temperatures to provide a complex in an inert solvent. The reducing agent is added to the complex in the solvent to provide an active species.

Although the general scheme of these systems has been varied within considerable limits, the prior art describes homogeneous liquid phase catalyst systems. Such systems have a number of disadvantages. For example, they present a materials handling problem and are not readily and completely separated from the low molecular weight oligomers and polymers commonly produced by such catalyst systems. A solid phase catalyst would overcome these problems and, therefore, would be highly advantageous for this reason alone. Beyond this, however, it would be highly desirable for such solid catalysts to also exhibit significant activity for codimerization of different olefins at a higher level and over a longer period than the previously known homogeneous systems, while yielding the same product distribution. It also is desirable to provide a catalyst which can be easily regenerated.

SUMMARY OF THE INVENTION

It has been found that an iron or cobalt electron donor ligand complex of organic substituted elements of Group V-A of the Periodic Table, having an atomic weight of 15 to 83, when combined in controlled proportions with a nonprotonic Lewis acid reducing agent capable of reducing iron or cobalt to an oxidation state of less than 2, on a solid, acidic silica-based support, as described more fully hereinafter, provides a relatively stable, solid phase composition having highly desirable chemical and physical characteristics. For example, the catalysts of this invention are readily and firmly supported on an active surface material, thus exhibiting high stability and catalytic activity. Reduced amounts of, for instance, both diphosphine and organoaluminum compound can be used to form an active catalytic species than those reported for similar homogeneous phase catalysts. The cost of the catalyst, therefore, can be reduced considerably. Catalytic activity is maintained at a high level for a much longer period than displayed by homogeneous systems. The catalytic life is prolonged remarkably by supporting the catalytic promoters on the silica-containing base, and the poisoning effects of possible deactivators, such as air or moisture, are considerably lessened. The present catalysts provide many advantages pertaining to the use of conventional heterogeneous catalyst techniques over homogeneous catalysts used in the liquid phase. The supported catalyst is still capable of exhibiting sterospecificity and selectivity of the reactions as with the homogeneous system because the ligands are still coordinated to the metal supported on the solid phase. This enables one to run reactions in a continuous operation without having undue difficulties in handling and storage of the catalyst. A tedious separation process of products from the solvent and catalyst, which is essential to the homogeneous reaction, is no longer needed. The catalyst of this invention can be regenerated by simply adding fresh portions of ditertiary phosphine and/or trialkylaluminum to the aged catalyst.

DETAILED DESCRIPTION OF THE INVENTION

In accordance with this invention, the iron or cobalt source is provided by compounds which are at least slightly soluble in some solvent wherein the transition metal-Group V-A ligand complex can be formed. Preferred are the weak field ligand complexes, the ligands of which can readily be exchanged.

In the preparation of the catalyst of the present invention a suitable transition metal source is provided. Exemplary of such sources are halides, e.g., $FeCl_3$, $FeBr_3$, $FeI_3$; $CoCl_2$, $CoBr_2$, $CoI_2$; alkoxy derivatives, e.g., $Fe(OR)_3$, $Co(OR)_2$, where R represents alkyl, aryl, aralkyl, and the like, groups; dialkoxy metal carboxylates, e.g., $(RO)_2FeOOCR'$ and the corresponding cobalt compounds, where R and R' are defined above for R; diphosphine complexes, e.g., $Fe[(C_6H_5)_2PC_2H_4P(C_6H_5)_2]X_2$, $Co[(C_6H_5)_2PC_2H_4P(C_6H_5)_2]X_2$, where X is a halide. Also available as metal sources are chelates formed by iron or cobalt and weak field ligands, such as β-diketones or β-ketocarboxylic acid esters and salts of carboxylic acids. Examples of these types of metal source include β-diketonato cobalt (II), β-diketonato iron-(II), acetylacetonato cobalt(II), acetylacetonato iron(II), propylacetonato cobalt, propylacetonato iron(II), benzoylacetonato iron; chelates from β-ketocarboxylic acids esters; salts of saturated monocarboxylic acids, e.g., ferric formate, cobalt stearate, cobalt formate, and the like; salts of corresponding unsaturated monocarboxylic acids, e.g., ferric or cobalt acrylate, and the like; ferric or cobalt salts of saturated dicarboxylic acids, e.g., ferric adipate, cobalt adipate, and the like; like salts of corresponding unsaturated dicarboxylic acids, e.g., ferric muconate, ferric or cobalt salts of cyclic and aromatic carboxylic acids, e.g., cobalt phenylacetate, ferric cyclohexane carboxylate, cobalt or iron naphthenate, cobalt benzoate, and the like; and dialkoxycarboxylates, e.g., ferric dimethoxyacetate, cobalt dimethoxy acetate, and the like. (In the foregoing discussion it is preferred that R and R' be lower-alkyl, e.g., 1–6 carbons or, when aryl, contain no more than about ten carbons).

The electron donor ligand component can be a hydrocarbon substituted organophosphine, particularly ditertiary phosphines of the type $R_2P(CH_2)_nPR_2$ where R can be alkyl or phenyl and contains from 1 to about 20 carbon atoms and can be substituted with nondeleterious groups (preferably devoid of olefinic or acetylenic unsaturation), and $n = 1$, 2, 3, or 4. The preferred ligand component is bis(diphenylphosphino)ethane. Other phosphorous-containing compounds such as monotertiary phosphines, $R_3P$, $P(OR)_3$, $P(OC_6H_4C_6H_5)_3$, or unsaturated ditertiary phosphines, $R_2PCH=CHPR_2$ where R is as defined above, can be employed. Other electron donor ligands can also be used, including for example, tertiary and ditertiary arsines, stibines, and bismuthines; alkyl or arylphosphites and phosphine oxides; phosphorous and organophosphorous chlorides; nitrogeneous chelate ligands, e.g., 2,2'-dipyridyl, ethylenediamine, pyridine, 1,10-phenanthroline, 8-aminoquinone, Shiff base ligands, and the like; ligands containing phosphine and amine groups, e.g., diethylaminoethyldiphenylphosphine, bis(diethylaminoethyl)phenylphosphine, and the like.

The Lewis acid and the reducing agent functions can be supplied by alkyl metal compounds. In general the metal alkyls employed herein have at least one alkyl substituent. In addition to alkyl, the other substituents can be, for example, hydrogen or alkoxy. For instance, the alkyl metal can have the formula $AlR_nX_m$ wherein Al stands for Aluminum in the usual fashion, R is alkyl, say of up to about 20 carbon atoms and X is hydrogen, alkoxy of up to about 6 carbon atoms, or hydrocarbyl group, preferably alkyl, of up to about 20 carbon atoms, $n$ is 1 to 3 and $m$ is 0 to 2, with $n+m$ being 3. Preferably R and X have up to about 6 carbon atoms, especially 2 to 4. Exemplary of the alkyl metal compounds are those of the following general formulas: $R_nM$, $R_nM_zX_y$, $R_nMH$, and $AMR_n$, wherein M is a Group I-A, II-A, II-B, III-A, III-B or IV-A metallic element of the Periodic Table of the Elements of coordination number $n$ (e.g., 1–5), $z$ is a number having a value of 1 to 2, and $y$ is a number having a value from 1 to 4, $y$ plus $n$ being 2 to 6. X is alkoxy (preferably 1 to 6 carbons) or hydrogen, R is hydrocarbyl, e.g., alkyl of up to about 20 carbon atoms, A is an alkali metal. Preferred metallic elements, M, in the above compounds include aluminum, magnesium, beryllium, lead, mercury, zinc, lithium, and tin, of which aluminum is especially preferred. Examples of suitable metal alkyls include trialkylaluminum, monoalkoxydialkylaluminum, and dialkylaluminum hydrides, wherein the alkyl and alkoxy groups contain up to about 6 carbon atoms. Other examples are Grignard reagents, allyl and alkyl tin, mercury, zinc, lithium beryllium complexes, and the like. The reducing agent must be compatible with the Lewis acid and be capable of reducing the iron or cobalt compound, preferably to an oxidation state lower than 1 and even to 0. The amount of total cobalt and iron in the silica-based support in the catalysts of this invention is a minor amount effective to enhance the desired olefin polymerization and often ranges from about 0.05 or 0.1 weight percent up to about 15 or more weight percent, and is preferably about 0.3 to 5 weight percent of the support. The molar ratios of the electron donor ligand to iron and cobalt is often about 0.3 to 20:1 or about 0.8 to 10:1. A ratio of about 0.8 to 4:1 is preferred. The amount of the Lewis acid-reducing agent, e.g., triethylaluminum, can vary with the ratio of electron donor ligand-to-metal (cobalt and iron), generally the minimum amount preferred increases as the ligand is increased. The Lewis acid-reducing agent component is often in the catalyst in a minimum mole ratio to metal (cobalt and iron) of about 3:1. For instance this range may be about 3:1 when the ligand-to-metal mole ratio is about 0.8 to 2:1, ranging up to a minimum of about 12:1 where the ligand-to-metal ratio is about 10:1. The Lewis acid-reducing agent will not ordinarily be utilized in the catalyst in a mole ratio of such agent to iron or cobalt of greater than about 60:1, preferably the ratio is about 5 to 20:1. In a preferred embodiment, the catalyst of the present invention comprises a black solid phase of iron or cobalt catalyst and, per mole of such metal, about 0.8 to 2 moles of diphosphine, and about 3 to 40 moles of aluminum alkyl.

The solid support of the catalyst of the present invention is an acidic silica-based material, e.g., having a D+L activity of at least about 20, preferably at least about 30 when determined according to the method of Birkhimer et al., "A Bench Scale Test Method for Evaluating Cracking Catalysts", Proceedings of the American Petroleum Institute, Division of Refining, Vol. 27 (III), page 90 (1947), and hereinafter referred to as Cat A. The silica-based support preferably has a substantial surface area as determined by the BET nitrogen absorption procedure [JACS, Vol. 60, pp. 309 et seq. (1938)]. The surface area of the support can be at least about 50 square meters per gram, and such surface areas are often up to about 500 or more $m^2/gm$., preferably about 150 to 400 $m^2/gm$. It is preferred that the catalyst support be relatively dry to avoid undue reaction with and loss of catalytic promoting materials. Thus it is advantageous that the support be calcined, e.g., at temperatures of about 600 to 1500° F. or more, to reduce the water content, but such calcination should not be so severe that the support is no longer catalytically-active. The support component contains other materials in addition to silica which materials, when combined with silica, provide an acidic material, as in, for instance, the case of silica-alumina. Often these materials are one or more oxides of the metals of Groups II, III and IV of the Periodic Table. Examples of the composites contemplated herein under the generic designation of silica-based materials are often composed predominantly of or even to a major extent of silica. These supports include, for example, silica-alumina, silica-boria, silica-zirconia, silica-magnesia, silica-alumina-zirconia, silica-alumina-thoria, silica-alumina-magnesia, and the like. The silica-based support can contain amorphous or crystalline material such as a crystalline aluminosilicate, for instance, having pore openings in the 6 to 15 Angstrom unit range. The support often contains silica and alumina and such supports, whether naturally-occurring, as in acid-treated clays, or a synthetic gel, will frequently contain about 10 to 60, preferably about 15 to 45, weight percent alumina. In addition, such silica-alumina supports can, and preferably do contain a portion of the alumina as a separate, distinct phase.

A highly preferred catalyst support can be made by combining a silica-alumina hydrogel with a hydrous alumina with or without (preferably without) a crystalline alumino-silicate. An advantageous hydrous alumina component is, when analyzed by X-ray diffraction of dry samples, either one or a mixture of amorphous hydrous alumina and a monohydrate, e.g., boehmite, of less than about 50 Å, preferably less than about 40 Å, crystallite size as determined by half-width measurements of the (0, 4, 1) X-ray diffraction line calculated by the Debye-Scherrer equation. The mixture of the catalyst precursor components can be dried, e.g., at about 220 to 500° F., to convert the silica-alumina hydrogel to xerogel form. The dried material can then be calcined, e.g., at a temperature of about 700 to 1500° F., preferably about 800 to 1400° F., to provide the active catalyst support. During calcination, the separate hydrous alumina phase of the mixture is converted to a gamma form or other catalytically active alumina.

In providing the preferred catalyst support precursor for drying, the components can be combined in any suitable manner or order desired, and advantageously each of the components is in the mixture in finely-divided form, preferably the particles are principally less than about 300 mesh in size. The finely-divided material can have an average particle size of about 10 to 150 microns and can be used to make a catalyst of this particle size which can be employed in a fluidized bed type of operation. However, if desired, the mixture of catalyst support components can be placed in macrosized form, that is, made into particles as by tabletting, extruding, etc., to sizes on the order of about 1/64" to 1/2" or more in diameter and about 1/32" to 1" or more in length, before or after drying or calcination. If formation of the macrosized particles is subsequent to calcination and the calcined particles have been contacted with water, the material can be recalcined.

On a dry basis, the preferred supports of the catalysts of the present invention contain about 45 to 95 weight percent of the amorphous silica-alumina xerogel, about 5 to 55 weight percent of the separately added alumina phase, and about 0 to 50 weight percent of the crystalline alumino-silicate, preferably the proportions of these ingredients are about 75–90%, about 10–25% and about 0–20%, respectively. If present, the crystalline alumino-silicate is usually at least about 1 weight percent, preferably at least about 5 weight percent, based on the dried support. The alumina content from the silica-alumina xerogel and the separate alumina phase is about 20 to 70 weight percent, preferably about 25 to 60 weight percent, based on the dried support. Also, the catalyst support generally contains less than about 1.5 weight percent, preferably less than about 0.5 weight percent sodium.

The silica-alumina component of the precursor of the preferred catalyst support of the present invention can be a silica-alumina hydrogel which contains about 55–90, preferably about 65–75, weight percent silica and about 10–45, preferably about 25–35, weight percent alumina, on a dry basis. The silica-alumina can be naturally-occurring or can be synthetically prepared by any desired method and several procedures are known in the art. For instance, an amorphous silica-alumina hydrogel can be prepared by coprecipitation or sequential precipitation by either component being the initial material with at least the principal part of the silica or alumina being made in the presence of the other. Generally the alumina is precipitated in the presence of a silica gel. It is preferred that the silica-alumina hydrogel be made by forming a silica hydrogel by precipitation from an alkali metal silicate solution and an acid such as sulfuric acid. Then alum solution may be added to the silica hydrogel slurry. The alumina is then precipitated by raising the pH into the alkaline range by the addition of an aqueous sodium aluminate solution or by the addition of a base such as ammonium hydroxide. Other techniques for preparing the silica-alumina hydrogel are well known in the art, and these techniques may be used in the practice of the invention.

The alumina hydrogel which can be combined with the silica-alumina is made separately from the silica-alumina. The alumina hydrogel may be prepared, for example, by precipitation of alumina at alkaline pH by mixing alum with sodium aluminate in an aqueous solution or with a base such as soda ash, ammonia, etc. As noted above, the alumina hydrogel can be in the form of amorphous hydrous alumina or alumina monohydrate, e.g., of up to about 50 Å crystallite size as determined by X-ray diffraction analysis. The amorphous hydrous alumina generally contains as much combined water as does an alumina monohydrate. Mixtures of the monohydrate and amorphous forms of hydrous alumina are preferred and often this phase is composed of at least about 25% of each of the separate members.

In preparing the catalyst support, one may separately filter the silica-alumina hydrogel and the hydrous alumina and intimately mix these materials, for instance, by colloidal milling. Although in this particular procedure a low sodium crystalline aluminosilicate can be added after the milling, this ingredient can also be combined before the colloidal milling operation. The mixture is dried, water washed to acceptable concentrations of, for instance, sodium and redried in the preferred procedure. The drying, especially the initial drying, is advantageously effected by spray drying to give microspheres.

The crystalline aluminosilicate which can be present in the catalyst support of the present invention, can have pore openings of 6 to 15 Å in diameter, and preferably the pore openings have a diameter of 10 to 14 Å. Usually, with a given material, the pores are relatively uniform in size and often the cyrstalline aluminosilicate particles are primarily less than about 15 microns in size, preferably less than about 10 microns. In the crystalline aluminosilicate the silica-to-alumina mole ratio is often greater than about 2:1 and is usually not above about 12:1, preferably being about 4 to 6:1. The aluminosilicate may be available in the sodium form, and the sodium can be removed before or after the crystalline aluminosilicate is added to the other catalyst support ingredients.

It is preferred to exchange the sodium with ammonium ions, for instance, through contact with an aqueous solution of ammonium chloride or another water-soluble ammonium compound. Subsequently, during drying and/or calcination, the ammonium ion may break down to release ammonia and leave an acid site on the aluminosilicate. On a molar basis, the ammonium or hydrogen ion is usually at least about 10% or even at least about 50%, based on the alumina content of the crystalline aluminosilicate. Suitable replacements for the sodium also include the polyvalent metals of the periodic chart including the Group IIa and rare earth metals such as cerium, etc. The metals may be present along with the ammonium or hydrogen cations.

The order in which the components are combined to prepare the supported catalyst of the present invention can be varied. The catalysts can be conveniently prepared by impregnating the silica-based support material with a solution of the iron or cobalt component, e.g., ferric acetylacetonate, in a solvent, e.g., methanol. The impregnated support after solvent removal is then preferably sequentially contacted with a solution of the electron donor ligand component, e.g., bis(diphenylphosphino)ethane or tri-$n$-butylphosphine, and then the reducing agent (or Lewis acid component or components) e.g., tri-isobutylaluminum.

Although the foregoing is a preferred method for preparing the catalyst of this invention, the iron or cobalt complex can first be prepared for subsequent impregnation into the silica-based support. The preparation of the unsupported metal complex can be conducted by first forming the complex of the electron donor ligand and the metal source and then adding to a solution or suspension, of that complex, in a suitable organic solvent, the reducing agent and the Lewis acid. Suitable organic solvents are those which are inert to the catalyst and which will not enter into, or deleteriously affect, the eventual dimerization or oligomerization reaction. As specific examples thereof may be mentioned aromatic and aliphatic hydrocarbons and their halogenated, e.g., chlorinated, derivatives. Oxygen-containing solvents are generally to be avoided for this purpose.

Formation of the ligand-metal complex may be effected by simply mixing the two reactants in the presence of a suitable solvent for the complexing reaction. The mixing can be done at room temperature or up to as high as about 300° F. The complex usually forms within about 30 to 120 minutes. Suitable solvents for the complex-forming reaction include the same solvents which are suitable for use in making the catalyst composition containing the Lewis acid-reducing agent. If desired, however, the complexing may be accomplished in a solvent which is unsuitable for use in making the latter composition; in this case the resultant complex will first be isolated from the reaction mixture and re-dissolved or re-suspended, in a proper solvent which is inert to the catalyst composition containing the Lewis acid-reducing agent.

Thus, for example, one method of preparing a phosphine-iron or cobalt complex can involve stirring or refluxing, preferably at elevated temperature, a mixture of bis(diphenylphosphino)ethane, ferric acetylacetonate and chlorobenzene or toluene. In this type of preparation there may often be employed a molar ratio of phosphine to ferric acetylacetonate of about 0.8:1 to 10:1, preferably about 0.8:1 to 2:1. After the complex has been formed there may then be added directly to the reaction mixture the Lewis acid-reducing agent. In another method the complex may be prepared by refluxing an alcohol, e.g., ethanol, solution of the phosphine, say bis-(diphenylphosphino)ethane and cobalt acetylacetonate, preferably at a temperature of about 150 to 250° F., and isolating the resultant complex from the reactant mixture. In this manner of preparation there will generally be employed about 1 to 10 moles, preferably about 1 to 2 moles, of phosphine per mole of metal acetylacetonate. The isolated complex can then be dissolved or suspended in a suitable inert solvent, e.g., chlorobenzene or toluene, and the reducing agent added thereto to form the complex of the catalyst composition of the present invention. The addition to the complex solution of the reducing agent is preferably conducted in a dry-inert atmosphere (argon or nitrogen), out of the presence of air, for instance in an autoclave. Within a relatively short period of time after the admixing of the components, e.g., about 5 to 15 minutes, the catalyst complex can be formed, preferably as a colloidal precipitate suitable for impregnating the silica-based supports of this invention.

The supported catalyst compositions of the present invention are effective for codimerization, cooligomerization, or copolymerization of monoolefinic hydrocarbons with diolefins of the conjugated type, and are highly desirable for such uses. These catalysts are exceptionally well suited for the preparation of the nonconjugated 1,4-dienes by a catalytic reaction of conjugated dienes with monoolefins of 2 to about 8, preferably about 2 to 4, carbon atoms, and in particular, exhibit very long catalytic activity for the preparation of 1,4-dienes from 1,3-butadienes or 1,3-pentadienes with ethylene, propylene, butylenes, etc. In the latter cases the present supported catalyst, therefore, allows the production of 1,4-hexadienes from 1,3-dienes and monoolefins continuously through very simple conventional operations known for usual heterogeneous catalyst systems. 1,4-Hexadiene, 3-methyl-1,4-hexadienes, and 2-methyl-1,4-hexadiene were produced from 1,3-butadiene with ethylene, 1,3-pentadiene with ethylene, and 1,3-butadiene with propylene, respectively, in very high selectivities and high conversions. With the cobalt catalyst 3-methyl-1,4-heptadiene was also formed in significant yields from the reaction of 1,3-butadiene and ethylene, in addition to 1,4-hexadiene.

Hexadienes are very useful products for commercial purposes. 1,4-Hexadiene, which is a nonconjugated isomer, is extremely useful as a third component to give vulcanizable properties to ethylene-propylene polymer rubber.

The conjugated diene hydrocarbons which can be reacted in accordance with the present invention include those of 4 to about 12 carbon atoms, especially the aliphatic dienes of 4 to 8 carbon atoms, such as the butadienes and pentadienes. Substituted 1,3-dienes can be used as a conjugated diene reactant. Alkyl groups, whose number of carbon atoms ranges from 1 to 8, can be employed as substituent groups. Considering the usefulness of the products formed from the diene reactant, the side groups which have carbon number 1-6 are more desirable. These compounds are generally described as 2-alkyl-1,3-butadienes, 1-alkyl-1,3-butadienes, 2,3-dialkyl-1,3-butadienes, and 2-phenyl-1,3-butadiene. Consequently, the 1,4-hexadienes, which can be produced with the present supported catalyst, are, for example, 5-alkyl-1,4-hexadienes, 4-alkyl-1,4-hexadienes, 3-alkyl-1,4-hexadienes, and 6-alkyl-1,4-hexadienes (wherein the alkyl substituent contains 1 to 8 and preferably 1 to 6 carbons) by appropriate combination of diene and monoolefin reactants.

Copolymerization can generally be effected by contacting the olefinically-unsaturated feed at a temperature of about 0 to 200° F., preferably about 50 to 100° F. to 175° F., which ordinarily can be maintained by the heat of reaction without external heating means. It may be necessary to control the temperature by cooling, as for example, by circulating a cooling medium through heat exchange tubes in the reactor. Pressures of up to about 1000 psig, preferably about 200 to 1000 psig, are suitable with the catalyst composition of the present invention. The amount of catalyst composition used in the reaction is that sufficient to effect codimerization or oligomerization of the feed and often is about 1 to about 20, preferably 1-10, WHSV of catalyst composition (not including the solvent therefor) based on the weight of hydrocarbon feed.

The preparation of an acidic silica-alumina support of this invention is illustrated by Examples I–III and the support contains a separate phase of alumina.

EXAMPLE I

An alumina hydrogel is prepared as follows:

In a tank containing 5700 gallons of water at 85° F., are dissolved 300 lbs. of soda ash. When the soda ash has been dissolved, 180 gallons of a 39% concentration aqueous sodium aluminate solution are pumped into the tank in about a 15 minute period. The contents of the tank are at about 84° F. Six-hundred gallons of aqueous aluminum sulfate of 7.8% concentration, as $Al_2O_3$, are added to the admixture over an 80-minute period with water of dilution in conjunction with and in addition thereto, diluting the reaction mass at a rate of 25 gallons per minute.

The pH of the resulting aqueous reaction mass is adjusted to 8.0 with about 75 gallons of 39% concentration aqueous sodium aluminate solution which, while being added, is also diluted continuously with water at a rate of 35 gallons per minute over a 7½ minute addition period. The contents of the tank are heated to about 100° F., and pumped to storage.

The precipitated, hydrated alumina is thereafter filtered on a large gel filter. The filtered product is partially purified by a one-cycle, water-wash on the filter on which it is collected. This filter is a string vacuum type drum filter with a built-in water spray nozzle directed toward the filter drum. Material on the drum is contacted with water as the drum rotates past the nozzle. After washing, the wet alumina hydrogel is stripped from the drum. This hydrogel analyses about 50% boehmite having a crystallite size of about 35 Å, and 50% amorphous hydrous alumina as determined by X-ray diffraction on dried samples.

EXAMPLE II

A silica-alumina hydrogel is prepared by the following technique:

To a batch tank is added 4,275 gallons of water preheated to 90° F., and 865 gallons of sodium silicate solution (28.8 weight percent $SiO_2$, 40–41.5 Baume at 68° F. and $Na_2O:SiO_2$ ratio of 1:3.2) is added. The batch is stirred for five minutes. The concentration of the sodium silicate, as $SiO_2$, in the batch is 6.3 weight percent.

With the batch at 90° F., 302 gallons of 34.5 weight percent sulfuric acid solution at 182° F. are added over a period of 45 minutes. The gel forms about 35 minutes after acid addition is begun. Then the pH is adjusted to 8.0–8.5. The batch is agitated for ten minutes.

Then 715 gallons of alum (7.8 weight percent, as $Al_2O_3$) is added to the gel over a period of about 36 minutes. The batch is agitated for an additional five minutes whereupon 205 gallons of sodium aluminate solution (24.4 weight percent as $Al_2O_3$) diluted in 1080 gallons of water is added over a period of 17 minutes. After all the sodium aluminate is added, the pH is checked. It should be between 5.0 and 5.2. The alumina content of the silica-alumina hydrogen is 30–31%.

EXAMPLE III

The silica-alumina hydrogel product of Example II and 1740 gallons of the alumina hydrogel filter cake of Example I are mixed together for one hour. The finished batch has a pH of 5.5 to 5.6 and a temperature of about 110° F. The aqueous gel mixture is then pumped to a dewatering filter, and the filter cake from said dewatering filter and a portion of aqueous gel are blended to give a gel slurry of about 14 weight percent solids. A portion of this hydrogel mixture was slurried, as a thick flowable paste, with a "Lightnin" stirrer fitted with a cage-beater and a propellor, for about 10 minutes to give a thorough dispersion. The product was stirred one minute at 14,500 rpm., in a Waring Blender and dried in a laboratory spray-drier. The spray-dried material was washed with water to acceptable impurity levels and dried at 230° F. The washed and dried material analyzed 0.08% $SO_4$ and less than 25 ppm $Na_2O$. The dried material as such was used as the catalyst support, as were extruded forms thereof and tablets (pellets) having diameters of about ⅛ inch and lengths of about ⅛ to ½ inch. Before use the catalyst support was calcined in a muffle furnace by raising the temperature by 300° F. per hour until 1350° F. was reached. This temperature was then held for three hours.

The calcined particles had a surface area of about 320 to 340 meters per gram.

The following example illustrates the preparation of an iron catalyst of this invention.

EXAMPLE IV

Fifteen grams of silica-alumina support having a separate alumina phase and prepared according to Example III, impregnated with ferric acetylacetonate (2.70 m (milli)moles), was introduced into a chlorobenzene solution of bis(diphenylphosphino)ethane (1.61 m moles in 40 ml. chlorobenzene) under nitrogen atmosphere. When this mixture was allowed to react for 2-3 hours, the silica-alumina pellets turned dark due to the formation of a diphosphine complex of iron (III). A toluene solution (25%) of triisobutylaluminum (37 m moles) was injected into the diphosphine complex system. The pellets changed to dark greenish-brown after the system was allowed to react for two hours. A light supernatant liquid was separated from the dark greenish-brown pellets by means of a syringe needle. The supported catalyst was washed three times until the wash solution became clear.

Example IV was repeated, except that the three components, ferric acetylacetonate, bis(diphenylphosphino)ethane, and triisobutylaluminum, were mixed together in toluene (rather than chlorobenzene) along with the silica-alumina support. The catalyst described in Example IV was obtained. Likewise, the silica-alumina support impregnated with ferric acetylacetonate, dried at 150-180° C., and thereafter, having the bis(diphenylphosphino)ethane and triisobutylaluminum added thereto in toluene, resulted in the same catalyst.

The following example illustrates the preparation of a cobalt catalyst of this invention.

EXAMPLE V

The supported catalyst was prepared from 1.16 m (milli)moles anhydrous cobalt chloride, 1.13 m moles bis(diphenylphosphino)ethane, 32.4 m moles triisobutylaluminum and 10 g. of silica-alumina support prepared according to Example III. Fresh silica-alumina (10 g.) was added to the dark green mixture of cobalt acetylacetonate and bis(diphenylphosphino)ethane in 30 ml. toluene. After 32 m moles of triisobutylaluminum solution in toluene was injected to the system, the reaction was allowed to proceed for about an hour. The pellets became darker leaving a lighter supernatant liquid. The liquid was separated from the dark pellets by means of a syringe needle. The dark supported catalyst pellets were washed twice until the wash solution became clear.

Example V was repeated, except that the three components, cobalt chloride, bis(diphenylphosphino)ethane, and triisobutylaluminum, were mixed together in toluene (rather than chlorobenzene) along with the silica-alumina support. The catalyst described in Example V was obtained. Likewise, the silica-alumina support impregnated with cobalt chloride, dried at 150-180° C., and thereafter, having the bis(diphenylphosphino)ethane and triisobutylaluminum added thereto in toluene, resulted in the same catalyst.

In Examples IV and V a similar catalyst can be prepared by substituting an equivalent amount of the calcined forms of the following, commercially available amorphous silica-alumina cracking catalysts for the acidic silica-based support employed therein: "W-Beads" (Socony-Mobil) having 10.65% alumina, etc.; or "Durabead 1-Virgin" (Socony-Mobil) having 10.38% alumina, etc.

The novel supported catalysts of this invention are particularly useful for the preparation of 1,4-dienes by a catalytic reaction of conjugated olefins with monoolefins. The following examples illustrate this embodiment of the subject invention.

EXAMPLE VI

The supported ferric catalyst of Example IV was transferred to a reactor. It was impossible to exclude air entirely in the process. After the reactor was purged with nitrogen for about ten minutes, 110 ml. 1,3-butadiene was introduced and ethylene was added at the pressure range of 700-950 psig and at 130-150°F. A moderate pressure drop was observed for the first hour. After allowing 1⅓ hours for reaction, the clear liquid reaction mixture was withdrawn from the reactor, and distilled into two fractions. The product was identified by means of gas chromatography, hydrogenation and IR Spectroscopic techniques. The lighter fraction (72.1 g.) was found to be composed of 98.2% 1,cis-4-hexadiene, containing a very small amount of 2,4-hexadiene and a trace amount of 1,3-hexadiene.

It is interesting to note that the heavier molecular weight fraction (14%) obtained with the present supported catalyst is much smaller than that (50%) reported with homogeneous liquid phase reaction under similar conditions by Miyake et al. (16). Much higher selectivity for the 1,4-hexadiene codimer production was, therefore, obtained with the present supported catalyst system. Tables I-II list details of results obtained in this run.

EXAMPLE VII

A) The supported ferric catalyst was prepared from 1.50 m moles ferric acetylacetonate, 1.13 m moles bis(diphenylphosphino)ethane; and 18.6 m moles triisobutylaluminum with 10 g. of fresh silica-alumina pellets prepared in accordance with Example III. Ten grams of pellets were soaked in a toluene solution of ferric acid acetylacetonate and bis-(diphenylphosphino)ethane in toluene for ½ hour, and then a triisobutylaluminum solution in toluene was introduced to the system. After two hours, the catalyst formed in the system was adsorbed on the pellets and the supernatant liquid was drained from the supported catalyst, which was then washed three times with toluene.

Piperylene (40 ml. mixture of cis, trans isomers, Aldrich) was added to the catalyst in the reactor, and ethylene was introduced at a constant pressure of 800 psig. Reaction was continued at 160° F. for three hours. A clear reaction product was withdrawn from the reactor, and was distilled into two fractions. The lighter fraction (6.9 g.) was chiefly composed of 3-methyl-1-cis-4-hexadiene, a small amount of 1-cis-4-heptadiene and a trace amount of conjugated heptadienes. The heavier fraction (4.0 g.) is believed to be mostly dimeric products of piperylene and codimers of $C_7$-diene products and ethylene.

B) In an additional run, 60 ml. of piperylene was added to a supported catalyst, which was prepared from 0.90 m mole ferric acetylacetonate on 5 g. silica-alumina pellets prepared as in Example III, 1.24 m moles bis(diphenylphosphino)ethane, and 33.0 m moles triethylaluminum. Addition of ethylene was immediately followed at the pressure range of 200-950 psig and 120° F. Reaction was discontinued after two hours. 3-Methyl-1-cis-4-hexadiene was obtained in very high selectivity (~ 80%), but conversion of the piperylene was low (11.2%). This may be attributed to the fact that the bulky piperylene molecule is difficult to orient for coordination on the limited space of active sites of the supported catalyst.

Results obtained in runs A and B are listed in Tables I-II.

EXAMPLE VIII

The supported catalyst which was prepared from 1.80 m moles ferric acetylacetonate on silica-alumina pellets prepared in accordance with Example III, 1.77 m moles bis(diphenylphosphino)ethane and 27.4 m moles triisobutylaluminum, was charged into a 300 cc. autoclave. After the autoclave was purged with nitrogen for 15 minutes and closed tightly, 1,3-butadiene (130 ml.) was fed and the system was pressured with ethylene to 800-1000 psig and 180° F. The reaction was allowed to proceed with stirring for 3 hours. A rapid pressure drop was observed during the first 1½ hour period. The slightly yellow colored liquid product was discharged and distilled into two fractions. Analysis of the products, reaction conditions, and catalytic composition are listed in Tables I-II. The catalyst left inside of the autoclave was saved for additional experiments under similar conditions. Four runs were made over a 70 hour period. The catalyst was aged either in an ethylene or a nitrogen atmosphere between runs. Details of the results obtained are also listed in Tables I-II. A description of the remaining three runs of the series follows.

In the second run, 1,3-butadiene (125 ml.) was added to the catalyst, which was aged for about an hour, and the ethylene was continuously added at a constant pressure of 800 psig at 150° F. After a 2½ hour reaction under these conditions, a yellowish-clear liquid mixture was discharged from the reactor.

The catalyst left inside of the reactor after the second run was completed was aged in an unreacted ethylene atmosphere for 11 hours. A third run was made with this aged catalyst. 1,3-Butadiene (120 ml.) was introduced to the aged catalyst, and ethylene was added at the pressure range of 800-1000 psig. Reaction was continued at 175° F. for 3½ hours.

Since the catalytic activity of the supported system appeared to be maintained at an equal level through the last three runs, the fourth run was catalysis of the codimerization reaction between 1,3-pentadiene and ethylene. Piperylene (40 ml.) was introduced in the reactor and the system was pressured with ethylene at 800-1000 psig and 180° F. for 3 hours. Based on the piperylene conversion, it appeared that the catalytic activity was at lower level than the three previous runs. Analysis of the product obtained in this run was not attempted. Tables I-II also list the results obtained with these runs, except the 4th run.

was equipped with an air driven magnetic stirrer, and was used as a reactor. It was impossible to exclude air entirely in the catalyst transferring process. After the reactor was purged with nitrogen for 15-20 minutes, 85 ml. of 1,3-butadiene was introduced and ethylene was added at the pressure range of 700-800 psig and at 130° F. A moderate pressure drop was observed for the first hour. It was believed that the reaction was completed within 1-2 hours, judging from the pattern of pressure drop, but the reaction was allowed to proceed overnight (14 hours) under these conditions. The clear liquid products were withdrawn from the reactor and distilled into fractions. The product was identified by means of gas chromatography, hydrogenation, nuclear magnetic resonance, infrared, and mass spectroscopic techniques. The products were found to be composed of 92.9% of 1,cis-4-hexadiene and 5.4% of 3-methyl-1,cis-4-heptadiene. Small amounts of conjugated hexadienes, 2,4- and 1,3-hexadiene were also present in the product as a result of secondary reactions. These secondary reactions can easily be prevented in a continuous operation by lowering the contact time of reactant with catalyst.

High boiling products were analyzed to be mainly homodimers of 1,3-butadiene, 4-vinylcyclohexene (a major component) and 1,5-cyclooctadiene (a minor component). No linear homodimers of butadiene were detected in the product. The selectivity to 1,4-hexadiene was 93% and conversion of 1,3-butadiene fed to the reactor was about 75%. Tables III-IV list details of results obtained in this run.

The catalyst left inside of the reactor after the first run was saved for additional runs. Two more runs were made over a 40 hour period. The catalyst was aged either in

TABLE I
CATALYTIC COMPOSITION AND REACTION CONDITION

| | | Catalytic composition | | | | Reaction condition | | |
|---|---|---|---|---|---|---|---|---|
| Example No. | Run No. | $R_3Al^1$ m moles | Fe(acac) m moles$^3$ | $\phi_2PC_2H_4P\phi_2^2$ m moles$^2$ | Support$^3$ g. | Hour aged | Pressure psig | Temp. °F. | Time hr. |
| VI | | 37.3 | 2.70 | 1.61 | 15 | | 700-950 | 130-150 | 1½ |
| VII | a | 18.6 | 1.50 | 1.13 | 10 | | 800 | 160 | 3 |
| | b | 33.0 | 0.90 | 1.24 | 5 | | 900 | 120 | 2 |
| VIII | 1st | 27.4 | 1.80 | 1.77 | 10 | 0 | 800-1000 | 180 | 3 |
| | 2nd | 27.4 | 1.80 | 1.77 | 10 | 4 | 800 | 150 | 2½ |
| | 3rd | 27.4 | 1.80 | 1.77 | 10 | 19 | 800-1000 | 175 | 3½ |
| | 4th | 27.4 | 1.80 | 1.77 | 10 | 70 | 800-1000 | 180 | 3 |

$^1$ Triisobutylaluminum.
$^2$ Bis(diphenylphosphino)ethane.
$^3$ Silica-alumina catalyst produced in accordance with the method of Example III.

TABLE II
DISTRIBUTION OF PRODUCT

| | | | | Product | | | | | |
|---|---|---|---|---|---|---|---|---|---|
| Example No. | Run No. | Diene feed 1,3-BD g. | 1,3-$C_5^{==}$ g. | 1,4-$C_6^{=*}$ g. | 3-M-1,4-$C_6^{=}$ g. | 1,4-$C_7^{=}$ | Heavy product* g. | Selectivity to 1,4-dienes, percent | Conversion of diene feed, percent |
| VI | | 67.9 | | 72.1 | | | 12.1 | 85.7 | 91.3 |
| VII | a | | 27.8 | | 4.5 | 0.8 | 5.6 | 41.1 | 31.4 |
| | b | | 41.7 | | 4.8 | 0.8 | 1.0 | 85.2 | 11.2 |
| VIII | 1st | 81.5 | | 100.8 | | | 11.9 | 87.5 | 99.3 |
| | 2nd | 78.4 | | 62.5 | | | 5.2 | 92.3 | 96.0 |
| | 3rd | 75.2 | | 51.3 | | | 5.1 | 90.9 | 74.9 |

*1,4-$C_6^{==}$ plus a small amount of 2,4-$C_6^{==}$ and 1,3-$C_6^{==}$.
**3-M-1,4-$C_6^{=}$ plus a small amount of conjugated dienes.
***Mostly homodimers of butadiene or piperylene.

EXAMPLE IX

The supported cobalt catalyst produced in Example V was transferred to a 300 cc. autoclave. This autoclave an ethylene or a nitrogen atmosphere between runs. A description of the remaining two runs of the series follows.

In the second run, 1,3-butadiene (95 ml.) was added to the same catalyst, which was aged for about 18 hours, and ethylene was continuously introduced at a pressure range of 700–800 psig at 160° F. After a six hour reaction under these conditions, a clear reaction mixture was discharged from the reactor. 1,cis-4-Hexadienes (74%) and 3-methyl-1,cis-4-heptadiene (19%) were found in the product. At higher temperatures the formation of 3-methyl-1,4-heptadiene was predominant, and consequently the amount of 1,4-hexadiene was decreased.

The third run was made with the catalyst which was aged for about 29 hours. 1,3-Butadiene (75 ml.) was allowed to react with ethylene at an ethylene pressure of 650–720 psig. Reaction was continued at 140° F. for 12 hours. In this run the further addition of ethylene to hexadiene to give 3-methyl-1,4-heptadiene was very evident under these conditions. The product was analyzed to be composed of mainly 1,4-hexadiene (51.7%) and 3-methyl-1,4-heptadiene (44.6%).

Details of the results obtained in both the second and third runs are also listed in Tables III–IV.

The catalytic activity of the present supported catalyst was maintained at an equal level through three runs over a 40 hour period. The selectivities to 1,cis-4-hexadiene and 3-methyl-1,cis-4-heptadiene can be readily controlled by adjusting reaction conditions. In other words, the present catalyst can also be utilized for the production of 3-methyl-1,cis-4-heptadiene from ethylene and butadiene as well as for production of 1,cis-4-hexadiene.

EXAMPLE X

The black supported cobalt catalyst was prepared from 1.98 m moles bis(diphenylphosphino)ethane, 20.45 m moles triethylaluminum and 7.0 g. of silica-alumina pellets (produced in accordance with the method of Example III), impregnated with 1.89 m moles $CoCl_2$. When the $CoCl_2$ impregnated pellets were put into a toluene solution of bis (diphenylphosphine)ethane, the pellets became dark green leaving a colorless supernatant liquid. When the triethylaluminum solution was injected into this system, the dark green pellets changed color gradually from yellow to red, and then to black at the final stage (over a 2½ hour period). After the resulting black pellets were washed with toluene a few times, they were transferred to the reactor. 1,3-Butadiene (70 ml.) was immediately introduced to the reactor, and ethylene was added to the system at 700–720 psig. Reaction was continued at 180° F. for 2¼ hours. After a clear reaction mixture was taken out of the reactor, four additional runs were made with the same catalyst under similar conditions. The reaction product was found to be composed of 1,cis-4-hexadiene (84%) and 3-methyl-1,cis-4-heptadiene (11%). A very high conversion (97%) of butadiene fed to the reactor was obtained.

The 1:1 addition reaction of ethylene to butadiene may be completed in much shorter period than 2¼ hours. (In order to prevent the formation of 3-methyl-1,4-heptadiene under the present conditions, the reaction period can be shortened to ½ to 1 hour from 2¼ hours.) The ratio of ethylene to butadiene in the system may also be another key factor to control the 3-methyl-1,4-heptadiene formation. In the second run, 1,3-butadiene (70 ml.) was added to the catalyst, which was aged for about three hours, and ethylene was pressured at 700 psig and 150° F. for 3 hours. A considerable amount of 3-methyl-1,cis-4-heptadiene (37%) was found in the product along with 55% of 1,4-hexadiene. Tables III–IV list details of the reaction conditions and products obtained in both the first and second runs.

In general, the supported catalyst exhibited a higher catalytic activity and more stability than the corresponding homogeneous catalyst system. Thus, the further addition reaction of ethylene to 1,4-hexadiene takes place to much greater extent with the supported catalyst than the homogeneous system under similar reaction conditions.

In the third run, 1,3-butadiene (90 ml.) was introduced to the same catalyst, which was aged for about 7 hours, and the pressure of the system was maintained at 710 psig with propylene (200 ml.) at 150° F. for 1¼ hours. A very rapid pressure drop was observed during the reaction period. A clear reaction mixture, which was discharged from the reactor, was found to be composed of mainly 2-methyl-1,cis-4-hexadiene (76%), 1,cis-4-heptadiene (7%), hexenes (6%), and heavy boiling products. The selectivity to 2-methyl-1,4-hexadiene was very high (77%) and the conversion of 1,3-butadiene was 86%. Hexenes were produced by the homodimerization of the propylene reactant.

In the fourth run, another codimerization of 1,3-butadiene and propylene was run with the catalyst, which was now aged for about 19 hours. 1,3-Butadiene (60 ml.) was introduced. The reactor and the system was pressured at 400–450 psig and 150° F. by feeding propylene continuously. During the 1¼ hour period, 175 ml. of propylene was fed into the reactor. A discharged reaction mixture was distilled into two fractions. The lighter fraction (32 g.) was found to be composed of 2-methyl-1,cis-4-hexadiene (72%) and 1,cis-4-heptadiene (7.7%) by gas chromatography, and the heavier fraction (8 g.) was analyzed by a combination of N.M.R. and mass spectroscopy and contained 2-methyl-1,4-hexadiene (76 mole %), and octatrienes (5.4 mole %).

It is evident that a higher pressure of at least about 500 psig, for instance, ranging from about 500 to about 1,000 psig, is preferred for the codimerization of 1,3-butadiene and propylene when the results obtained in the third and fourth runs are compared. All the results obtained from the third and fourth runs are also listed in Tables III–IV.

In the fifth run, 45 ml. of 1,3-butadiene was added to the same catalyst, which was aged for 33 hours. The system was pressured at 250–300 psig by continuous feeding of ethylene. Under these conditions the system was maintained at 110° F. without applying heat. Reaction was allowed to proceed for two hours, and fifty grams of the reaction mixture was obtained. No effort was made to analyze the product.

TABLE III

| Example No. | Run No. | Catalyst component | | | | | Reaction condition | | |
|---|---|---|---|---|---|---|---|---|---|
| | | $R_3Al$[1] m moles | $CoCl_2$ m moles | $\phi_2PC_2H_4P\phi_2$[2] m moles | Support[3] g. | Hours aged | Pressure psig | Temp. °F. | Time hr. |
| IX | 1st | 32.4 | 1.16 | 1.13 | 10.0 | | 700–800 | 130 | 14 |
| | 2nd | 32.4 | 1.16 | 1.13 | 10.0 | 18 | 700–800 | 160 | 6 |
| | 3rd | 32.4 | 1.16 | 1.13 | 10.0 | 29 | 650–720 | 140 | 12 |
| X | 1st | 20.5 | 1.89 | 1.98 | 7.0 | | 700–720 | 180 | 2¼ |
| | 2nd | 20.5 | 1.89 | 1.98 | 7.0 | 3 | 700 | 150 | 3 |
| | 3rd | 20.5 | 1.89 | 1.98 | 7.0 | 7 | 710 | 150 | 1¼ |
| | 4th | 20.5 | 1.89 | 1.98 | 7.0 | 19 | 400–450 | 150 | 1¼ |
| | 5th | 20.5 | 1.89 | 1.98 | 7.0 | 33 | 250–300 | 110 | 2 |

[1] Triethylaluminum.
[2] Bis(diphenylphosphino)ethane.
[3] Silica-alumina catalyst produced in accordance with the method of Example III.

TABLE IV

PRODUCT DISTRIBUTION

| Example No. | Run No. | Feed (1) 1,3-BD g. | (2) 1,3-C$_5^=$ g. | Product (3) 1,4-C$_6^=$ g. | (4) 2M-1,4 g. | 1,4-C$_7^=$ g. | (5) g. | Selectivity to the major product, percent | Conversion of diene feed, percent |
|---|---|---|---|---|---|---|---|---|---|
| IX | 1st | 53.3 | | 50.8 | | | 3.0 | 92.9 | 75.1 |
|  | 2nd | 60.0 | | 63.0 | | | 16.5 | 74.7 | 94.2 |
|  | 3rd | 47.0 | | 36.7 | | | 31.7 | 51.8 | 92.5 |
| X | 1st | 43.9 | | 54.1 | | | 6.9 | 84.1 | 96.8 |
|  | 2nd | 47.0 | | 34.3 | | | 23.2 | 54.5 | 95.5 |
|  | 3rd | 56.4 | | | 61.6 | 6.0 | 1.7 | 76.5 | 86.2 |
|  | 4th [a] | 37.6 | | | 23.2 | 2.5 | 0.3 | >80 | 76.9 |
|  | 5th [b] | 28.2 | | | 8.0 g. 50.0 g. reaction mixture | | | | |

[a] A fraction representing 72.4% of the product.
[b] A fraction representing 27.6% of the product.
[1] 1,3-Butadiene.
[2] 1,3-Pentadiene.
[3] 2-Methyl-1,4-Hexadiene.
[4] 1,4-Heptadiene.
[5] 3-Methyl-1,4-heptadiene.

Thus it can be seen that the ternary system catalysts of this invention are very effective for selective synthesis of 1,cis-4-dienes from the reaction of 1,3-butadiene and ethylene. Exemplary of such a reaction is the continuous production of 1,4-hexadienes or 1,4-C$_8$-dienes from conjugated dienes and mono-olefins with such a supported catalyst in a conventional fixed bed reactor.

The monoolefin–diolefin codimerization reactions of this invention can be carried out in a continuous reactor. For example, a fixed-bed, water-cooled reactor in which the catalyst has the acidic, silica-based support of this invention in either its pelletized or extruded form can be utilized. Exemplary of other types of continuous reactor systems which can employ the catalyst of this invention are moving bed fluidized systems. The catalysts can be prepared by co-adsorption from toluene of a soluble iron compound, such as ferric acetonylacetonate, and the phosphine onto the silica-based support, in its pellet, extrudate, or powdered form. The metal-phosphine loaded pellets can be charged to the reactor system and reduced to an active zerovalent complex in situ by contact with an aluminum alkyl or alkyl hydride, normally in the presence of ethylene. A mixed ethylene-butadiene feed is charged continuously to the system; flow of each olefin is metered separately, and the ethylene is kept in excess to prevent polymer formation. After the reaction begins and the reactor lines out, timed product can be taken and analyzed (generally by gas chromatography, and, occasionally, mass spectrometry). Conversions, based on butadiene, and selectivities to cis 1,cis-4-hexadiene are usually in excess of 90% and quite frequently exceed 95%. The use of a propylene-butadiene feed yields a butadiene conversion of about 40% at 160–180° F. The major product is cis 2-methyl-1,cis-4-hexadiene.

In carrying out continuous reactions, it is preferred to employ an iron complex catalyst, as described herein. Such catalysts appear to give maximum product selectivity. Reduction of the complex to an active catalyst system is preferably effected with triisobutylaluminum, diisobutylaluminum hydride or triethylaluminum. The reduction is preferably carried out in the presence of ethylene. Temperatures below 180 °F. are preferred. When higher temperatures are employed, it is preferred to use a slurry system.

I Claim:

1. In a process for copolymerizing a monoolefinic hydrocarbon of 2 to about 8 carbon atoms with a conjugated diolefin hydrocarbon of 4 to about 8 carbon atoms to produce a cis-1,4-diolefin product, the improvement which comprises conducting said polymerization in contact with a catalyst comprising a complex of (A) iron, cobalt or mixtures thereof;

(B) an electron donor ligand of hydrocarbon substituted elements of Group V–A of the periodic table selected from the group consisting of a monotertiary phosphine, a ditertiary phosphine, a monotertiary arsine, a ditertiary arsine, a monotertiary stibine, a ditertiary stibine, a monotertiary bismuthine, and a ditertiary bismuthine;

(C) a metal reducing agent capable of reducing iron or cobalt to an oxidation state of less than 2, having the formula $R_nM$, $R_nM_zX_y$, $AMR_n$, and mixtures thereof, wherein each M is selected from a Group II–A, II–B, III–A, III–B or IV–A metallic element of the Periodic Table of the Elements of coordination number $n$ of from 1 to 5, $z$ is a number having a value of 1 to 2, $y$ is a number having a value from 1 to 4 wherein $y$ plus $n$ is from 2 to 6, X is selected from hydrogen and alkoxy of from 1 to about 6 carbon atoms, each R is hydrocarbyl, and A is an alkali metal;

on a solid acidic silica-based support, said catalyst containing a minor amount of (A) sufficient to enhance the olefin copolymerization activity of said catalyst, said catalyst containing a mole ratio of (B) to (A) of about 0.3 to 20:1, a mole ratio of (C) to (A) of at least about 3:1, and said components (C) and (A) being combined to reduce cobalt or iron, represented by (A), to an oxidation state of less than 2.

2. A process of claim 1 wherein each M is selected from aluminum, magnesium, beryllium, lead, zinc, and tin, and each R is alkyl of up to about 20 carbon atoms.

3. A process of claim 1 wherein the metal compound has the formula $R_nAlX_y$ wherein R is alkyl of up to about 20 carbon atoms, X is selected from hydrogen, alkoxy of up to about 6 carbon atoms, and hydrocarbyl of up to about 20 carbon atoms, $n$ is 1 to 3, $y$ is 0 to 2, and $n$ plus $y$ equals 3.

4. A process of claim 2 wherein (A) is present in an amount of from about 0.1 to 15 weight percent, based on said support, the mole ratio of (B) to (A) is about 0.8 to 10:1, and the mole ratio of (C) to (A) is about 5 to 20:1.

5. A process of claim 3 wherein (A) is present in an amount of from about 0.1 to 15 weight percent, based on said support, the mole ratio of (B) to (A) is about 0.8 to 10:1, the mole ratio of (C) to (A) is about 5 to 20:1, and components (A), (B) and (C) are present in a ratio which gives a colloidal precipitate.

6. A process of claim 1 wherein reactant (B) is selected from a ligand having the formula $$R_2^1P(CH_2)_nPR_2^1$$

wherein each $R^1$ is selected from hydrocarbon of 1 to about 20 carbon atoms, and $n$ is 1 to 4.

7. A process of claim 4 wherein reactant (B) is selected from a ligand having the formula $$R_2{}^1P(CH_2)_nPR_2{}^1$$

wherein each $R^1$ is selected from hydrocarbon of 1 to about 20 carbon atoms, and $n$ is 1 to 4.

8. A process of claim 5 wherein reactant (B) is selected from a ligand having the formula $$R_2{}^1P(CH_2)_nPR_2{}^1$$

wherein each $R^1$ is selected from hydrocarbon of 1 to about 20 carbon atoms, and $n$ is 1 to 4.

9. A process of claim 6 wherein the ligand is $R_2{}^1P(CH_2)_nPR_2{}^1$.

10. A process of claim 7 wherein the ligand is $R_2{}^1P(CH_2)_nPR_2{}^1$.

11. A process of claim 8 wherein the ligand is $R_2{}^1P(CH_2)_nPR_2{}^1$ and $R^1$ is phenyl.

12. A process of claim 11 wherein component (A) is cobalt, the monoolefinic hydrocarbon has from 2 to 4 carbon atoms, and the diolefin is 1,3-butadiene.

13. A process of claim 11 wherein component (A) is iron, the monoolefinic hydrocarbon has from 2 to 4 carbon atoms, and the diolefin is 1,3-butadiene.

14. A process of claim 4 wherein the support is calcined and is comprised of about 45 to 95 weight percent amorphous silica-alumina and about 5 to 55 weight percent alumina, the total alumina content of said support being about 20 to 70 weight percent.

15. The process of claim 5 wherein the support is calcined and is comprised of about 45 to 95 weight percent amorphous silica-alumina and about 5 to 55 weight percent alumina, the total alumina content of said support being about 20 to 70 weight percent.

16. The process of claim 15 wherein said alumina results from the calcination of a member selected from the group consisting of amorphous hydrous alumina, alumina monohydrate and mixtures thereof.

17. The process of claim 9 wherein the support is calcined and is comprised of about 45 to 95 weight percent amorphous silica-alumina and about 5 to 55 weight percent alumina, the total alumina content of said support being about 20 to 70 weight percent.

18. The process of claim 11 wherein the support is calcined and is comprised of about 45 to 95 weight percent amorphous silica-alumina and about 5 to 55 weight percent alumina, the total alumina content of said support being about 20 to 70 weight percent.

19. The process of claim 12 wherein the support is calcined and is comprised of about 45 to 95 weight percent amorphous silica-alumina and about 5 to 55 weight percent alumina, the total alumina content of said support being about 20 to 70 weight percent.

20. The process of claim 13 wherein the support is calcined and is comprised of about 45 to 95 weight percent amorphous silica-alumina and about 5 to 55 weight percent alumina, the total alumina content of said support being about 20 to 70 weight percent.

21. The process of claim 20 wherein said alumina results from the calcination of a member selected selected from the group consisting of amorphous hydrous alumina, alumina monohydrate and mixtures thereof.

* * * * *